US009252951B1

(12) United States Patent
Katzer (10) Patent No.: US 9,252,951 B1
(45) Date of Patent: Feb. 2, 2016

(54) VEHICLE KEY FUNCTION CONTROL FROM A MOBILE PHONE BASED ON RADIO FREQUENCY LINK FROM PHONE TO VEHICLE

(71) Applicant: Sprint Communications Company L.P., Overland Park, KS (US)

(72) Inventor: Robin D. Katzer, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/304,861

(22) Filed: Jun. 13, 2014

(51) Int. Cl.
*G05D 3/00* (2006.01)
*G05B 19/00* (2006.01)
*H04L 9/08* (2006.01)
*G07C 9/00* (2006.01)

(52) U.S. Cl.
CPC .......... *H04L 9/0838* (2013.01); *G07C 9/00309* (2013.01)

(58) Field of Classification Search
CPC .............. B60R 25/24; B60R 2325/105; B60R 2325/205; B60R 2325/101; B60R 25/406; G06K 7/10; G07C 9/00111; G07C 2009/0019; G07C 2009/00198; G07C 2009/00206; G07C 2009/00261; G07C 2009/00269; G07C 9/00817; H04L 9/0891; H04L 2209/80; H04M 1/72519; H04W 12/06; H04W 12/04; G06F 21/35
USPC .................... 701/2; 705/14.64, 14.66, 67, 44; 340/5.61, 989, 5.8, 5.86, FOR. 114
See application file for complete search history.

(56) References Cited

U.S. PATENT DOCUMENTS

| | | |
|---|---|---|
| 5,892,900 A | 4/1999 | Ginter et al. |
| 6,622,083 B1 | 9/2003 | Knockeart et al. |
| 7,209,964 B2 | 4/2007 | Dugan et al. |
| 7,366,892 B2 | 4/2008 | Spaur et al. |
| 7,376,392 B2 | 5/2008 | Myojo |
| 7,454,473 B2 | 11/2008 | Suzuki |
| 7,912,224 B2 | 3/2011 | Lee et al. |
| 7,949,375 B2 | 5/2011 | Kortge |
| 7,966,111 B2 | 6/2011 | Moinzadeh et al. |
| 8,271,050 B2 | 9/2012 | Weiss |
| 8,457,686 B2 | 6/2013 | Przybylski |
| 8,484,707 B1 | 7/2013 | Bertz et al. |
| 8,527,164 B2 | 9/2013 | Staudinger et al. |
| 8,548,532 B1 | 10/2013 | Ng |
| 8,606,335 B2 | 12/2013 | Ozaki |

(Continued)

OTHER PUBLICATIONS

Office Action dated Sep. 9, 2015, U.S. Appl. No. 13/463,799, filed on May 3, 2012.

*Primary Examiner* — Muhammad Shafi (57) ABSTRACT

A method of provisioning a mobile communication device with key functionality is disclosed. The method comprises a web portal receiving a request to add key functionality to a mobile communication device and a vehicle. The method comprises registering the mobile communication device via a vehicle key server as a precondition to add a key and a salt to the mobile communication device and a vehicle, wherein the key and the salt are codes. The method comprises accessing a vehicle key data store via the vehicle key server, wherein the data store comprises keys and salts. The method comprises transmitting the key and the salt to a trusted service manager (TSM) server via the vehicle key server; transmitting the salt to the vehicle, and transmitting the salt and the key to the mobile communication device, whereby the mobile communication device is enable to command the vehicle to unlock, lock, or start.

13 Claims, 8 Drawing Sheets

(56) References Cited

U.S. PATENT DOCUMENTS

| | | |
|---|---|---|
| 8,626,152 B2 | 1/2014 | Farrell et al. |
| 8,630,747 B2 | 1/2014 | Burcham et al. |
| 8,676,199 B2 | 3/2014 | Madhavan et al. |
| 8,750,942 B1 | 6/2014 | Ng |
| 8,787,949 B2 | 7/2014 | Sumcad et al. |
| 9,002,574 B2 | 4/2015 | Garrett et al. |
| 9,031,498 B1 | 5/2015 | Bertz et al. |
| 9,032,547 B1 | 5/2015 | Hohler et al. |
| 9,110,774 B1 | 8/2015 | Bonn et al. |
| 9,173,238 B1 | 10/2015 | Bloomcamp et al. |
| 2003/0096641 A1 | 5/2003 | Odinak |
| 2003/0120601 A1 | 6/2003 | Ouye et al. |
| 2003/0224840 A1 | 12/2003 | Frank et al. |
| 2004/0083041 A1 | 4/2004 | Skeen et al. |
| 2004/0125957 A1 | 7/2004 | Rauber et al. |
| 2004/0157650 A1 | 8/2004 | Wissinger et al. |
| 2005/0021744 A1 | 1/2005 | Haitsuka et al. |
| 2005/0065779 A1 | 3/2005 | Odinak |
| 2005/0113102 A1 | 5/2005 | Kwon et al. |
| 2006/0059480 A1 | 3/2006 | Kimoto |
| 2006/0143463 A1* | 6/2006 | Ikeda ............ B60R 25/04 713/182 |
| 2006/0168578 A1 | 7/2006 | Vorlicek |
| 2007/0028220 A1 | 2/2007 | Miller et al. |
| 2007/0086579 A1 | 4/2007 | Lorello et al. |
| 2007/0113269 A1 | 5/2007 | Zhang |
| 2007/0124043 A1 | 5/2007 | Ayoub et al. |
| 2007/0124045 A1 | 5/2007 | Ayoub et al. |
| 2007/0124046 A1 | 5/2007 | Ayoub et al. |
| 2007/0160199 A1 | 7/2007 | Sekiguchi et al. |
| 2007/0288423 A1 | 12/2007 | Kimoto |
| 2008/0034126 A1 | 2/2008 | Baker |
| 2008/0072047 A1 | 3/2008 | Sarikaya et al. |
| 2008/0148374 A1 | 6/2008 | Spaur et al. |
| 2008/0162676 A1* | 7/2008 | Magnusson ........ G07C 9/00904 709/222 |
| 2008/0289018 A1 | 11/2008 | Kawaguchi |
| 2008/0289044 A1 | 11/2008 | Choi |
| 2008/0307086 A1 | 12/2008 | Brooks et al. |
| 2009/0028082 A1 | 1/2009 | Wynn et al. |
| 2009/0049119 A1 | 2/2009 | Marcinkiewicz et al. |
| 2009/0109941 A1 | 4/2009 | Carter |
| 2009/0217036 A1 | 8/2009 | Irwin et al. |
| 2010/0097239 A1 | 4/2010 | Campbell et al. |
| 2010/0136944 A1 | 6/2010 | Taylor et al. |
| 2010/0197362 A1 | 8/2010 | Saitoh et al. |
| 2010/0220250 A1 | 9/2010 | Vanderwall et al. |
| 2010/0234071 A1 | 9/2010 | Shabtay et al. |
| 2010/0235285 A1 | 9/2010 | Hoffberg |
| 2010/0260350 A1 | 10/2010 | Chutorash et al. |
| 2010/0285787 A1 | 11/2010 | Matsuda |
| 2011/0009107 A1 | 1/2011 | Guba et al. |
| 2011/0086668 A1* | 4/2011 | Patel ............ G08C 17/02 455/556.1 |
| 2011/0090908 A1 | 4/2011 | Jacobson et al. |
| 2011/0099316 A1 | 4/2011 | Tseng et al. |
| 2011/0252415 A1 | 10/2011 | Ricci |
| 2011/0257973 A1 | 10/2011 | Chutorash et al. |
| 2011/0263293 A1 | 10/2011 | Blake et al. |
| 2011/0295444 A1 | 12/2011 | Westra et al. |
| 2011/0310731 A1 | 12/2011 | Park et al. |
| 2012/0109406 A1 | 5/2012 | Yousefi et al. |
| 2012/0127139 A1 | 5/2012 | Hayami et al. |
| 2012/0134497 A1 | 5/2012 | Roitshtein et al. |
| 2012/0159638 A1 | 6/2012 | McDade, Sr. |
| 2012/0167071 A1 | 6/2012 | Paek |
| 2012/0183221 A1 | 7/2012 | Alasry et al. |
| 2012/0203557 A1 | 8/2012 | Odinak |
| 2012/0282895 A1 | 11/2012 | Bai et al. |
| 2012/0324046 A1 | 12/2012 | Park |
| 2013/0082820 A1* | 4/2013 | Tieman ............ G07C 9/00309 340/5.61 |
| 2013/0205026 A1 | 8/2013 | Ricci |
| 2013/0218400 A1 | 8/2013 | Knoop et al. |
| 2013/0226391 A1 | 8/2013 | Nordbruch et al. |
| 2013/0297456 A1 | 11/2013 | Annan et al. |
| 2014/0053261 A1 | 2/2014 | Gupta et al. |
| 2014/0068010 A1 | 3/2014 | Nicholson et al. |
| 2014/0087760 A1 | 3/2014 | Bennett |
| 2014/0222298 A1 | 8/2014 | Gurin |

* cited by examiner

VEHICLE KEY FUNCTION CONTROL FROM A MOBILE PHONE BASED ON RADIO FREQUENCY LINK FROM PHONE TO VEHICLE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Key fobs may be used to gain access into a motor vehicle. Key fobs and motor vehicles may generate credentials created algorithmically based on a key and a salt. The key, the salt, and the credentials are numeric codes, wherein the salt is random data that is used as an input to a one-way function that hashes a password or passphrase. The key fob may be commanded by a user to transmit a credential to the motor vehicle. If the motor vehicle determines that the credential transmitted by the key fob matches a credential stored by the vehicle, the vehicle unlocks or locks the doors or starts the engine. If the credentials stored by the key fob become out of synchronization with the credentials stored by the vehicle, the credential transmitted by the key fob will not match a credential stored in the vehicle, and the vehicle will not act on the command transmitted by the key fob. Motor vehicle dealerships have proprietary control of the relationship and the synchronization between the key fob and the vehicle and their abilities to generate credentials using the key and the salt. If the key fob loses synchronization with the vehicle, the user may need to take the vehicle and the key fob to the dealer during business hours and pay a substantial fee to have the key fob re-synchronized to the vehicle.

SUMMARY

In an embodiment, a mobile communication device is disclosed. The device comprises a processor, a memory, and an application stored in the memory. The application when executed by the processor receives a key and a salt from a vehicle key server, wherein the key and the salt are numeric codes. The application generates a plurality of credentials based on the key and the salt using an algorithm, wherein the credentials are numeric codes that serve to unlock a vehicle associated with the key. The application further generates a new salt. The application transmits a sync command to the vehicle, wherein the sync command comprises the new salt, whereby the vehicle is commanded by the mobile communication device to generate a second plurality of credentials based on the key and the new salt using the algorithm.

In an embodiment, a method of unlocking a motor vehicle using a mobile communication device with key functionality is disclosed. The method comprises a mobile communication device receiving a key and a salt from a vehicle key server, wherein the key and the salt are numeric code values. The method further comprises the mobile communication device generating a plurality of credentials based on the key and the salt using an algorithm, wherein credentials are numeric codes that unlock a vehicle associated with the key. The method further comprises the mobile communication device transmitting one of the credentials to the vehicle, whereby the vehicle is unlocked. The method further comprises the mobile communication device deleting used credentials that are no longer available for unlocking the vehicle. The method further comprises the mobile communication device sending a sync command to the vehicle, wherein the command comprises a new salt generated by the mobile communication device; whereby the vehicle is commanded by the mobile communication device to generate a second plurality of credentials based on the key and the new salt using the algorithm. The method further comprises the mobile communication device generating new credentials that are available for use to unlock the vehicle.

In an embodiment, a method of provisioning a mobile communication device with key functionality is disclosed. The method comprises a web portal receiving a request to add unlock, lock, and start control functionality to a mobile communication device and a vehicle. The method further comprises the web portal registering the mobile communication device via a vehicle key server as a precondition to add the key and the salt to the mobile communication device and the vehicle. The method further comprises the web portal accessing a vehicle key data store via the vehicle key server, wherein the vehicle key data store comprises keys and salts. The method further comprises the web portal transmitting the key and the salt to the to a trusted service manager (TSM) server via the vehicle key server. The method further comprises the web portal transmitting the salt to the vehicle. The method further comprises the web portal transmitting the salt and the key to the mobile communication device, whereby the mobile communication device is enabled to command the vehicle to unlock, lock, or start.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for provisioning and managing a mobile phone with vehicle key functionality. For example, a mobile phone may transmit a credential such as a numeric code to the vehicle, the vehicle may validate the credential and then act accordingly to unlock, to lock, or start an engine of the vehicle. It is understood that the teachings of the present disclosure are contemplated to be applicable to a personal digital assistant (PDA), a media player, a wearable computer, or a headset computer. Telecommunication service subscribers that own motor vehicles may wish to add key functionality to their mobile phones, i.e., allow the mobile phone to unlock, lock, and/or start a motor vehicle. Subscribers may desire the ability to both provision their mobile phones with key functionality and manage said mobile phones and the vehicles associated with the mobile phones remotely.

Traditionally, key fobs provided by vehicle manufacturers may become out of synchronization with the associated vehicle under some circumstances (for example, if the key fob is activated too many times without unlocking a car, for example if a child pushes the unlock button of the key fob more than 256 times). In this situation, it may be necessary for the owner of the vehicle to take the key fob and the vehicle to the car dealer for the card dealer to then resynchronize both the vehicle and the key fob, a procedure that may cost several hundreds of dollars for the owner of the vehicle. The present disclosure teaches a system and method that enables the owner of the vehicle to invoke a resynchronization of the vehicle and mobile phone vehicle key functionality under this circumstance without having to engage the vehicle dealer, thereby avoiding cost and inconvenience. As taught further herein, a telecommunications service subscriber may manage this mobile phone key functionality using a web portal. Making the mobile phone key functionality dominant relative to the vehicle (i.e., the mobile phone is able to command the vehicle to complete a credential synchronize operation and to transmit a salt used to complete the credential synchronization operation) during credential synchronization enables the enhanced user capabilities.

Using the web portal, the telecommunications service subscriber may provision and manage his or her mobile phone with key functionality that will allow him or her to access his or her motor vehicle using his or her mobile phone. The telecommunications service subscriber registers with a vehicle key server using the web portal using a set of predefined credentials which may include his or her mobile phone number and vehicle identification number that is associated with his or her motor vehicle. This information is stored by the web portal to a vehicle key data store via the vehicle key server, wherein the vehicle key data store comprises information about the subscriber and a key and a salt that are generated by the vehicle key server. The key and the salt are numeric codes that are associated with the mobile phone and the motor vehicle, wherein the salt is random data that is used as an input to a one-way function that hashes a password or passphrase. An algorithm uses the key and the salt to generate credentials, wherein credentials are numeric codes that serve to unlock, lock, or start a motor vehicle from the mobile phone.

Once registered, a subscriber that wishes to add vehicle key functionality to his or her mobile phone may request this functionality using the web portal. The subscriber using the web portal sends a request to the vehicle key server which accesses the vehicle key data store and sends the key and the salt to a trusted service manager (TSM) via the vehicle key server. The TSM verifies the request and then sends the key and the salt to the subscriber's mobile phone and to the motor vehicle, for example to a telematics unit or in-car computer. Is understood that when the present disclosure speaks of transmitting credentials or keys or salts to the vehicle, the credentials or keys or salts may be transmitted to a telematics electronic unit in the vehicle or an in-vehicle computer. It is understood that when the present disclosure speaks of the vehicle performing the algorithm to generate credentials, to compare stored credentials received from the mobile phone, to unlock the doors, to lock the doors, to start the engine, it may be a telematics electronic unit in the vehicle or an in-vehicle computer that performs these actions. In an embodiment, it may not always be necessary to transmit the key to the vehicle, as the vehicle may have previously stored the key, for example during an initial configuration of a telematics electronics unit or of an in-vehicle computer during manufacturing of the vehicle.

With the same key and the same salt provisioned to the mobile phone and to the motor vehicle, each of the mobile phone and the motor vehicle separately execute the algorithm, and the algorithm operated on the same key and salt to generate a plurality of credentials. Because the same algorithm is executed on the same inputs (salt and key) the same plurality of credentials is generated and stored on both the mobile phone and the motor vehicle. Thereafter, when the subscriber commands the mobile phone to transmit a credential to the vehicle as an unlock command, the phone selects one of its credentials and transmits the credential to the vehicle. The vehicle receives and compares the received credential with its own credentials, if the credential from the phone matches one of the credentials stored by the vehicle, the vehicle performs the unlock command. With the credentials the subscriber is able to access his or her motor vehicle with his or her mobile phone. It is understood that the mobile phone may be used to transmit other commands to the vehicle along with a credential to command the vehicle to perform other actions such as locking the doors, starting the engine, rolling down one or more window, rolling up one or more window, opening the trunk, closing the trunk, opening a door, closing a door, opening the hood, closing the hood, and other commands.

In an embodiment, in addition to adding key functionality to a mobile phone for a motor vehicle, a subscriber may also be able to remove or reset mobile phones and motor vehicles from his or her account, wherein the subscriber is able to manage the credentials generated between a mobile phone and a vehicle. The subscriber may reset his or her mobile phone and motor vehicle as the number of credentials generated by the key and the salt associated with the mobile phone and motor vehicle is not unlimited, wherein the plurality of credentials comprises a number of credentials that may expire with each use and in order to generate new credentials, a subscriber may reset his or her mobile phone and vehicle. The subscriber may be able to request for a new key and salt for his or her mobile phone and motor vehicle by simply resetting his or her mobile phone and motor vehicle via the web portal.

The subscriber may desire the ability to reset the credentials generated by the mobile phone from the web portal because it provides convenience for the subscriber. Currently, subscribers go to their vehicle's respective motor dealer in order to reset their mobile phones. This may prove an inconvenience for some subscribers as some subscribers may not want to go their motor vehicle dealer as it is an extra expense and the going to the dealer's business during operating hours may be inconvenient for the subscriber.

With the web portal, telecommunications service subscribers may be able to both provision and manage mobile phones and vehicles on their accounts remotely. This provides convenience to a subscriber as he or she is able to provision and manage generation of credentials by mobile phones and vehicles to re-synchronize without going through a motor vehicle dealer to do so.

Figure 1A:
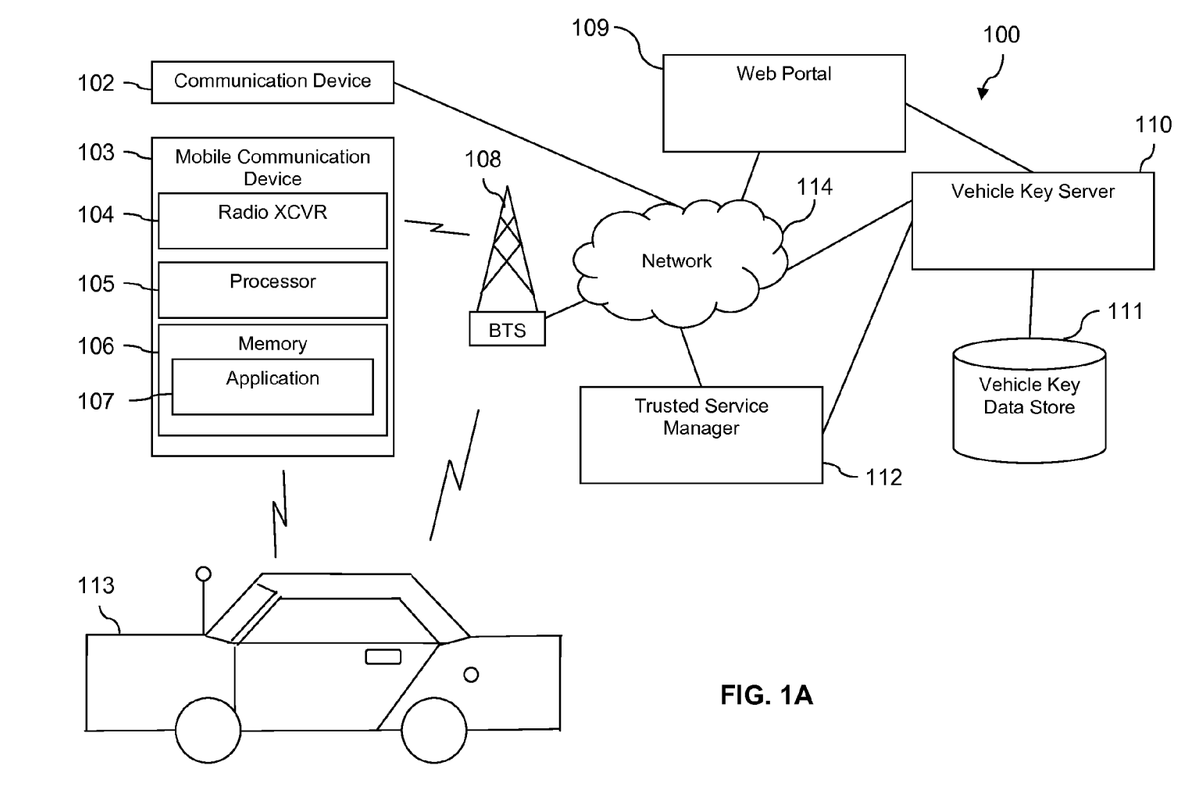
FIG. 1A is a block diagram of a system according to an embodiment of the disclosure.

Turning now to FIG. 1A, a communication system 100 is described. The system 100 comprises a communication device 102. The system 100 further comprises a mobile communication device 103. The mobile communication device 103 further comprises a radio transceiver (radio XCVR) 104, a processor 105, and a memory 106. The memory 106 further comprises an application 107, stored in the memory 106. The system 100 further comprises a base transceiver station (BTS) 108. The system 100 further comprises a web portal 109, a vehicle key server 110, a vehicle key data store 111, a trusted service manager (TSM) server 112, a motor vehicle 113, and a network 114. In an embodiment, the communication device 102 may be a personal computer or another electronic device that is capable of accessing the web portal 109. The mobile communication device 103 is one of a mobile phone, a personal digital assistant, a wearable computer, or a headset computer. The mobile communication device 103 may be implemented as a handset. Details of handsets are discussed further hereinafter.

In an embodiment, the application 107 that executes on the mobile communication device 103 is a vehicle key application. The application 107 enables the mobile communication device 103 to lock, unlock, and/or start the motor vehicle 113. In an embodiment, the application 107 executes an algorithm to generate a plurality of credentials. When selected by the user or subscriber, the device 103 and/or the application 107 transmits one of the credentials and a command to the vehicle 113, for example an unlock command. The vehicle 113 may compare the credential transmitted by the device 103 to credentials stored by the vehicle 113 and, if a match is found, the vehicle 113 performs the requested command, for example, unlock one or more doors of the vehicle 113. The application 107 may be pre-loaded onto the mobile communication device 103 before purchase or loaded post-purchase by a subscriber. In an embodiment, the BTS 108 may provide a wireless communication link to the mobile communication device 103. The BTS 108 may provide a wireless communication link to the mobile communication device 103 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless communication protocol. While one communication device 102 and one mobile communication device 103 are illustrated in FIG. 1A, it is understood that the system 100 may comprise any number of communication devices and mobile communication devices. While one base transceiver station 108 is illustrated in FIG. 1A, it is understood that the system 100 may comprise any number of base transceiver stations.

While one vehicle 113 is illustrated in FIG. 1A, it is understood that the system 100 may comprise any number of vehicles. It is understood that the vehicle 113 may be or contain a telematics electronic unit or an in-vehicle computer that performs the actions attributed to the vehicle 113 in this disclosure. For example, when it is written that a command and a credential are transmitted to the vehicle 113 by the device 103, the command and the credential may be transmitted by the device 103 to a telematics electronic unit or in-vehicle computer located in the vehicle 103 and configured to actuate mechanisms in the vehicle 113, for example door locks, engine ignition, and the like. The network 114 may be a public communication network, a private communication network, or a combination thereof.

In an embodiment, the web portal 109 is a web page that may be accessed by the communication device 102 and/or the mobile communication device 103. The application 107 may be used to access the web portal 109. The web portal 109 permits a subscriber that is associated with the communication device 102 and/or the mobile communication device 103 to register for a service that provisions his or her mobile communication device 103 with vehicle key capability that will lock, unlock, and/or start the motor vehicle 113. The web portal 109 also permits the subscriber that is associated with the mobile communication device 103 to manage the account that he or she registers for on the web portal 109.

The vehicle key server 110 is a server that receives requests from the web portal 109 to provision and/or manage an account that is associated with a subscriber that is associated with the communication device 102, the mobile communication device 103, and the motor vehicle 113. The vehicle key data store 111 is a data store that is accessed by the vehicle key server 110. The vehicle key data store 111 comprises keys and salts which are associated with the mobile communication device 103 and the motor vehicle 113. In an embodiment, keys and salts are numeric codes that may be used by an algorithm to generate credentials Credentials are numeric codes that are transmitted by the mobile communication device 103 to the vehicle 113 to command the vehicle 113 to lock, unlock, and/or start. As used herein, numeric codes may comprise any sequence of codes or symbols including but not limited to numeric symbols, alphanumeric symbols, American standard code for information interchange (ASCII) symbols, extended binary coded decimal interchange code (EBCDIC) symbols, or other symbols. In an embodiment, the credentials may be encoded as 8 bits or 8 binary symbols. Alternatively, the credentials may be encoded as another number of bits. Alternatively, the credentials may be encoded in another number base (base 3 or base 4, for example).

In an embodiment, to provision the mobile communication device 103 with vehicle key capability, a subscriber may access the web portal 109, using his or her mobile communication device 103 or the communication device 102. Once on the web portal 109, the subscriber may send a request to the web portal 109 to register to provision his or her mobile communication device 103 with vehicle key functionality. Using the web portal 109, the subscriber registers via the vehicle key server 110 which stores registration information about the subscriber into the vehicle key data store 111. In an embodiment, the subscriber may input information such as the phone number of the mobile communication device 103, the vehicle identification number (VIN) of the vehicle 113 or other predefined information as a precondition for registering for provisioning the mobile communication device 103 with vehicle key capability. The vehicle key data store 111 further comprises keys and salts, wherein keys and salts are numeric code values that are used by the mobile communication device 103 and the vehicle 113 to generate credentials. Credentials are numeric code values generated from the key and the salt of the mobile communication device 103 and the vehicle 113 that command the vehicle 113 to perform one of a function of locking, unlocking, and/or starting. In an embodiment, the key, the salt, and credentials are binary numbers, each number comprising at least 16 bits. In an embodiment the key, the salt, and the credentials are binary numbers that may further comprise at least 32 bits, 64 bits, or 128 bits or some other number of bits.

The vehicle key server 110 generates the key and salt for the mobile communication device 103 and the vehicle 113 of the subscriber and transmits the key and the salt for the mobile communication device 103 and the vehicle 113 to the TSM server 112. The TSM server 112 authorizes the keys and salts that are sent to the mobile communication device 103 and the vehicle 113. Once the TSM server 112 authorizes the key and the salt, the TSM server 112 transmits the key and the salt to the mobile communication device 103 and to the vehicle 113.

In an embodiment, the application 107 is executed by the processor 105 and receives a key and salt from a trusted service manager (TSM) server 112 via a vehicle key server 110, wherein the key and the salt are numeric code values. Using the key and the salt, the application 107 generates a plurality of credentials using an algorithm. In an embodiment, the same algorithm is used by the vehicle 113 and the mobile communication device 103. Given the same inputs, the algorithms produce the same outputs, i.e., matching pluralities of credentials. The algorithm generates a numeric fixed length code that cannot be back calculated to obtain the key or the salt. The algorithm may be a hashing function or other numeric processing. The algorithm may also be a one-way secure hashing function. The algorithm calculates 256 credentials or some other number of credentials using the key and the salt. In an embodiment, the key, the salt, and the credentials are binary numbers, each number comprising at least 16 bits. In an embodiment, the key, the salt, and the credentials are binary numbers that may comprise at least 32 bits, 64 bits, 128 bits, or some other number of bits. Once the plurality of credentials is generated, the application 107 transmits one of the credentials to the vehicle 113 where the credentials will lock, unlock, or start the vehicle 113. Once the credential has been used, the mobile communication device 103 deletes the used credential and generates a new salt in order to refresh the credentials, wherein refresh means to replace all credentials generated with new credentials that may be used to lock, unlock, or start the vehicle 113. Once the mobile communication device 103 has generated a new salt, the mobile communication device 103 transmits a sync command to the vehicle 113, wherein the sync command comprises the new salt, whereby the vehicle 113 is commanded to generate a second plurality of credentials based on the key and the new salt using the algorithm. In an embodiment, the mobile communication device 103 communicates with the vehicle 113 over a code division multiple access (CDMA) wireless protocol or another wireless protocol. The mobile communication device 103 communicates with a radio transceiver of the vehicle 113 at a radio frequency at or in between 300 and 400 megahertz.

In an embodiment, in the communicative relationship between the mobile communication device 103 and the vehicle 113, the mobile communication device 103 has dominance over the vehicle 113 and is able to command the vehicle 113 to sync. In prior art, the vehicle 113 had dominance over a key fob and commanded the key fob to re-sync. This is because vehicle dealerships had control over the relationship between key fobs and vehicles of subscribers, wherein subscribers could not manage the credentials generated by key fobs and vehicles.

In an embodiment, the salt may be generated by the mobile communication device 103 as opposed to receiving the salt from the TSM 112. This mobile communication device 103 would not be able to generate the salt without being initialized by the registration process of the mobile communication device 103 and the vehicle 113 commenced by the subscriber. After the mobile communication device 103 has been initialized and registered, the mobile communication device may be able to generate a new salt and transmit the new salt to the vehicle 113 in a sync command. With the new salt, the mobile communication device 103 and the vehicle 113 are able to generate new credentials using the vehicle key and the new salt.

Figure 1B:
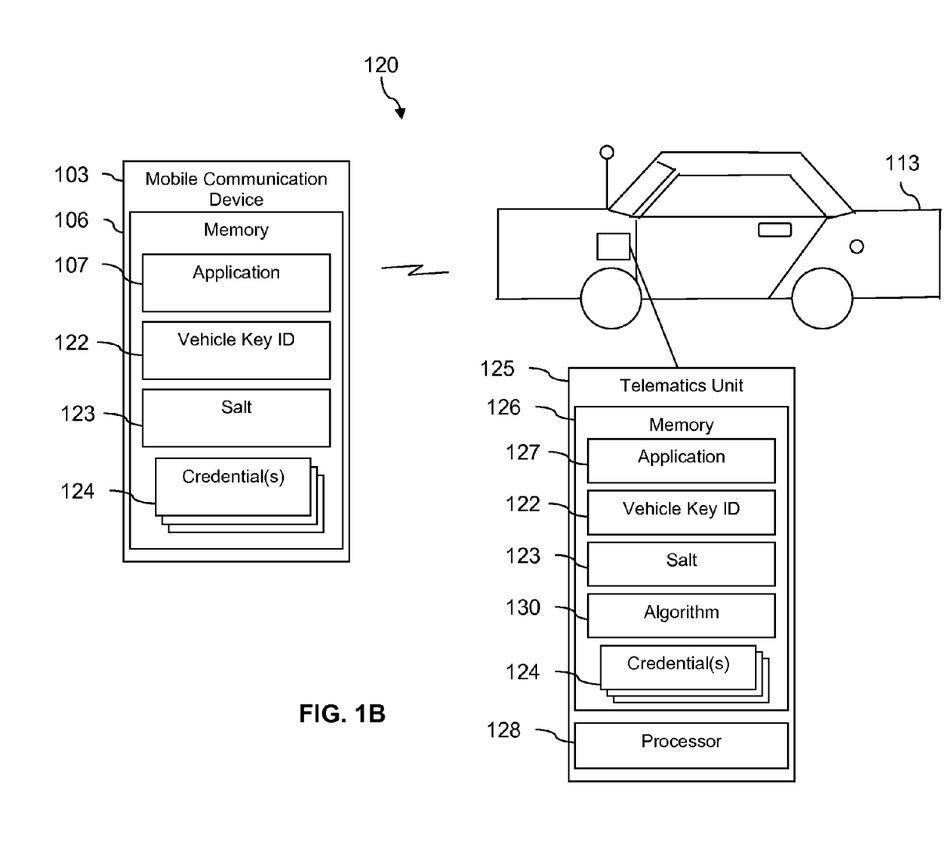
FIG. 1B is a block diagram of a system according to an embodiment of the disclosure.

In FIG. 1B, a communication system 120 is described. The system 120 illustrates further details of the system 100 described above with reference to FIG. 1A and comprises the mobile communication device 103 and the vehicle 113 from FIG. 1A. The mobile communication device 103 comprises the memory 106. The memory 106 further comprises the application 107, a vehicle key ID 122, a salt 123, and a plurality of credentials 124. The vehicle 113 further comprises a telematics electronic unit 125 which may also be referred to as an in-vehicle computer or a vehicle central processing unit (CPU). The telematics unit 125 further comprises a memory 126 and a processor 128. The memory 126 further comprises an application 127, the vehicle key ID 122, the salt 123, an algorithm 130, and the plurality of credentials 124. FIG. 1B represents the generation of the credentials 124 using the vehicle key ID 122 and the salt 123. The mobile communication device 103 transmits one of the credentials 124 to vehicle 113 using the radio transceiver 104 shown in FIG. 1A. The telematics unit 125 receives the credential 124 and compares the credential 124 to the plurality of credentials in the telematics unit 125. If the credentials 124 match, the vehicle 113 and/or the telematics electronic unit 125 performs the desired command of the credential 124. It is understood that the application 127 and the algorithm 130 may executed on the processor 128.

Figure 2:
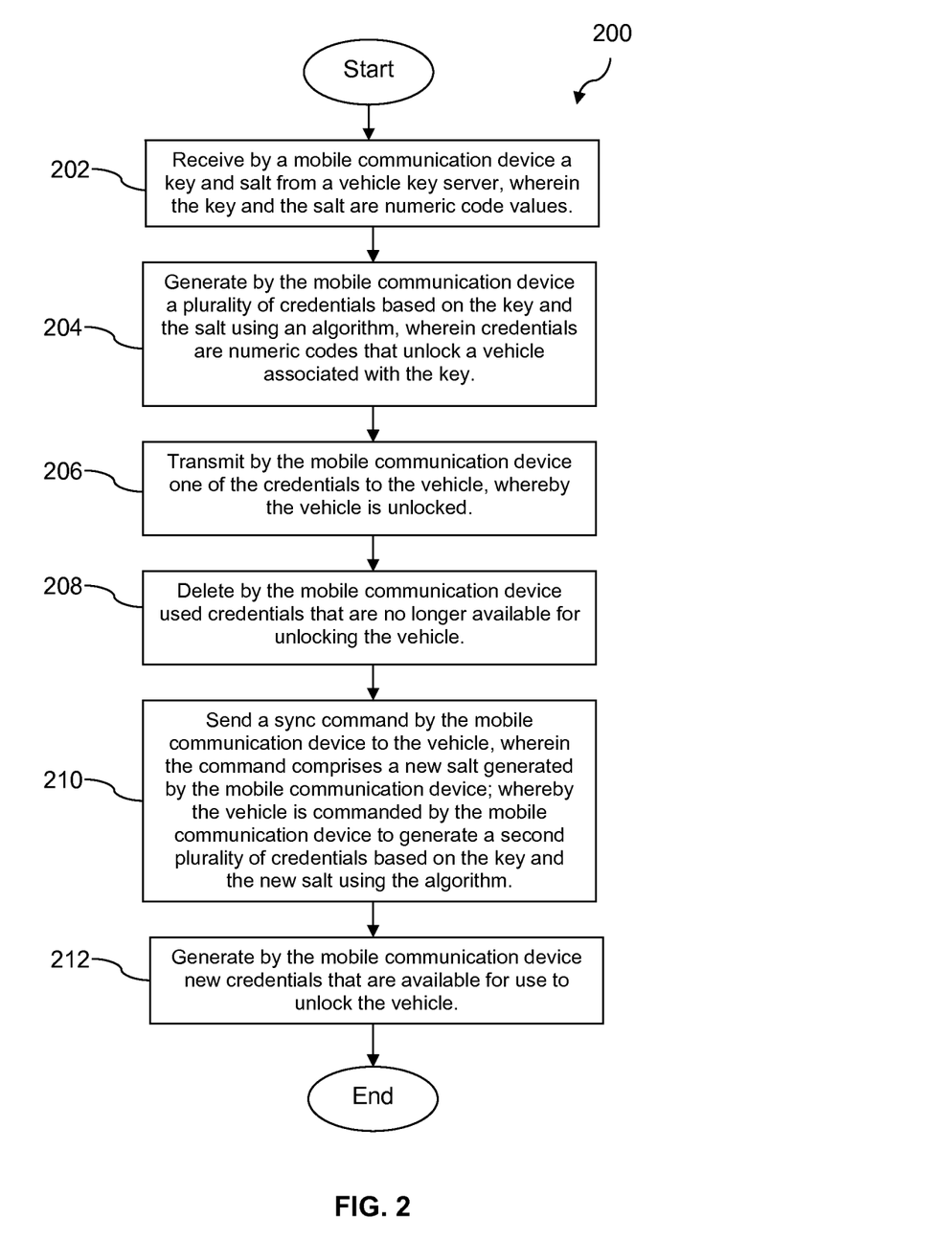
FIG. 2 is a flow chart of a method according to an embodiment of the disclosure.

In FIG. 2, a method 200 is described. At block 202, a mobile communication device receives a key and a salt from a vehicle key server, wherein the key and the salt are numeric code values. At block 204, the mobile communication device generates a plurality of credentials based on the key and the salt using an algorithm, wherein credentials are numeric codes that may be used to unlock a vehicle associated with the key. At block 206, the mobile communication device transmits one of the credentials to the vehicle, whereby the vehicle is unlocked, i.e., if the credential transmitted by the mobile communication device matches a credential stored in the vehicle. At block 208, the mobile communication device deletes used credentials that are no longer available for unlocking the vehicle. At block 210, the mobile communication device sends a sync command to the vehicle, wherein the command comprises a new salt generated by the mobile communication device; whereby the mobile communication device commands the vehicle to generate a second plurality of credentials based on the key and the new salt using the algorithm. At block 212, the mobile communication device generates new credentials that are available for use to unlock the vehicle.

Figure 3:
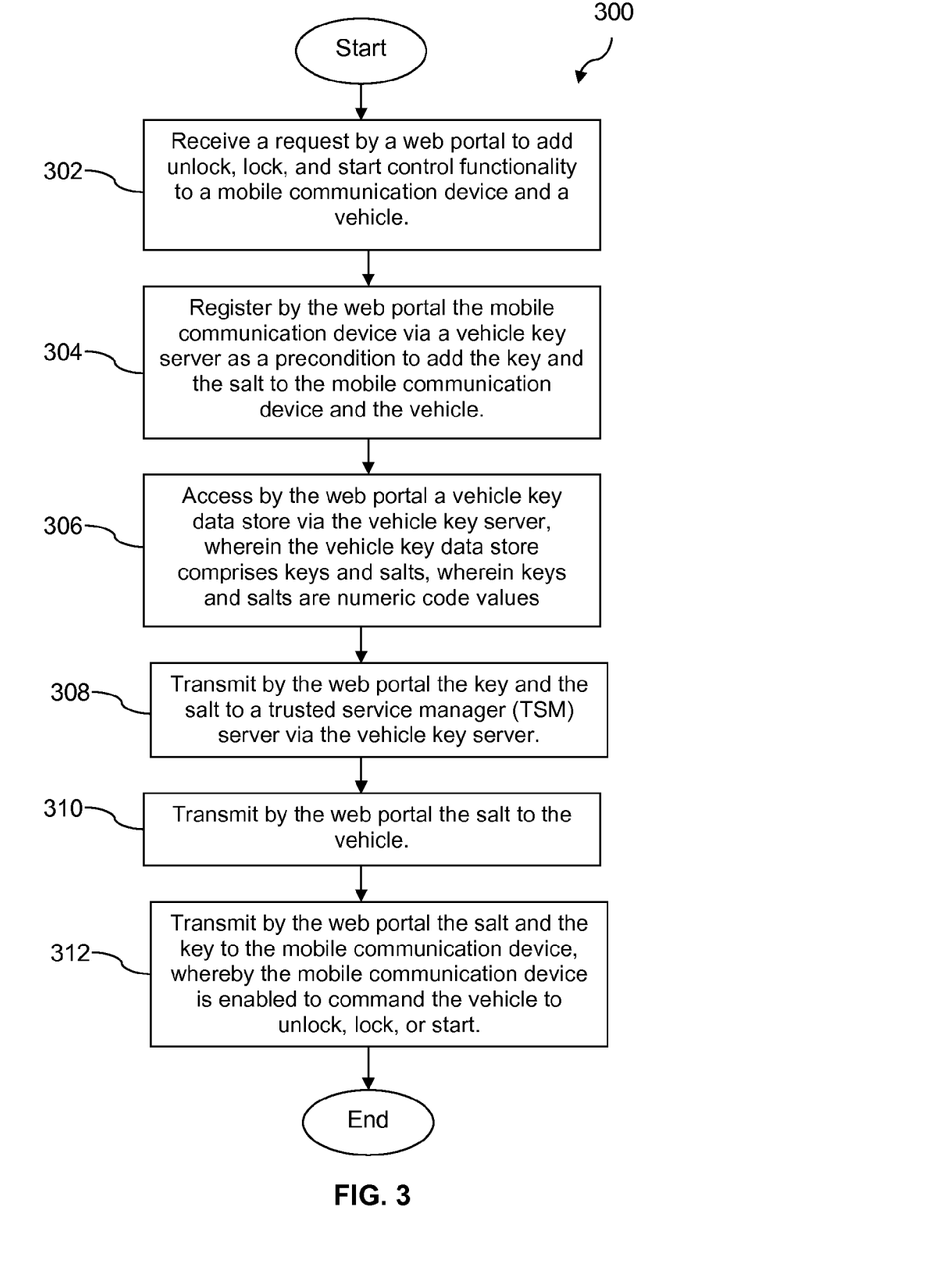
FIG. 3 is a flow chart of a method according to an embodiment of the disclosure.

In FIG. 3, a method 300 is described. At block 302, a web portal receives a request to add unlock, lock, and start control functionality to a mobile communication device and a vehicle. At block 304, the web portal registers the mobile communication device via a vehicle key server as a precondition to add a key and a salt to the mobile communication device and the vehicle, wherein the key and the salt are numeric code values. At block 306, the web portal accesses a vehicle key data store via the vehicle key server, wherein the vehicle key data store comprises keys and salts. At block 308, the web portal transmits the key and the salt to a trusted service manager via the vehicle key server. At block 310, the web portal transmits the salt to the vehicle. At block 312, the web portal transmits the salt and the key to the mobile communication device, whereby the mobile communication device is enabled to command the vehicle to unlock, lock, or start.

Figure 4:
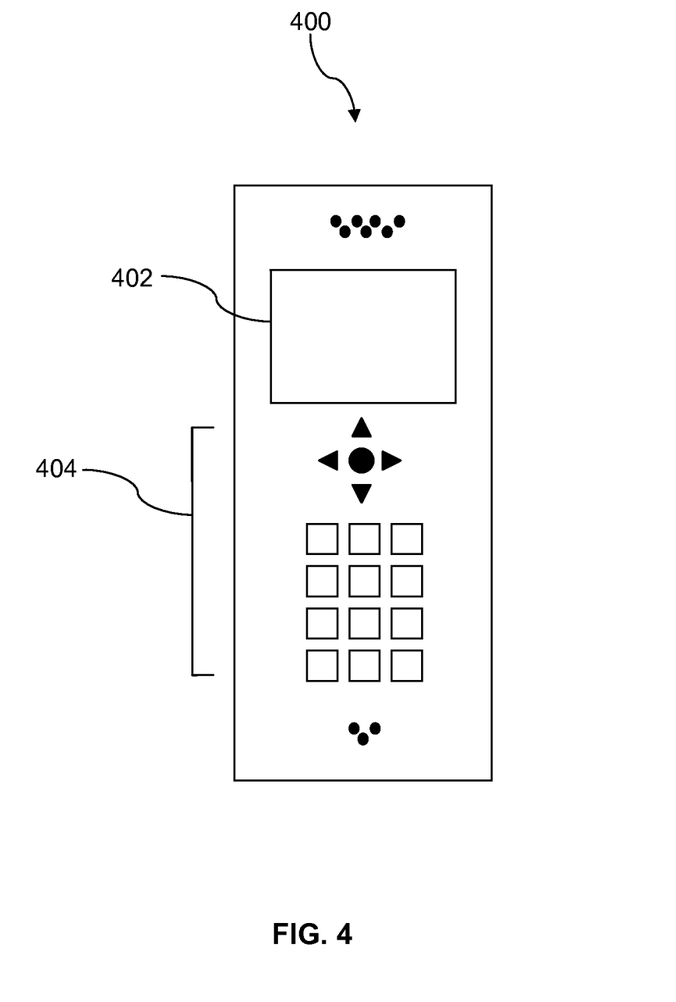
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
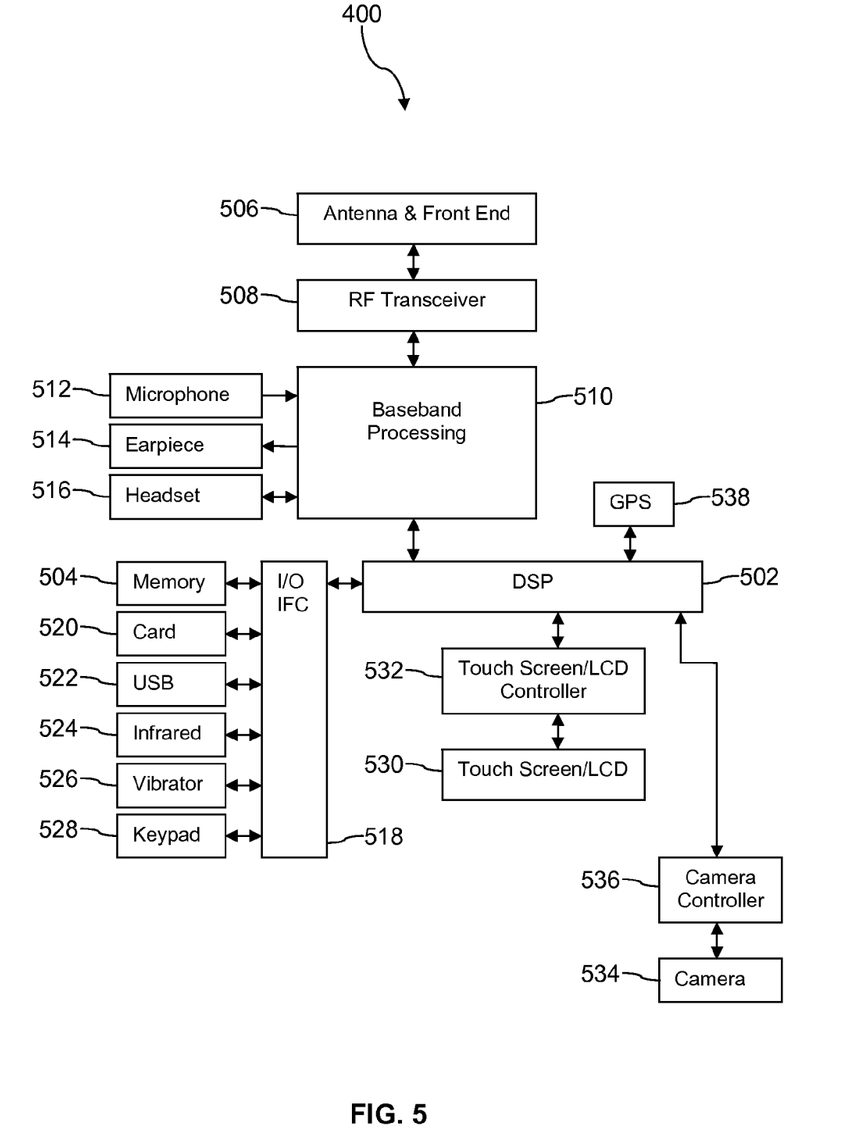
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
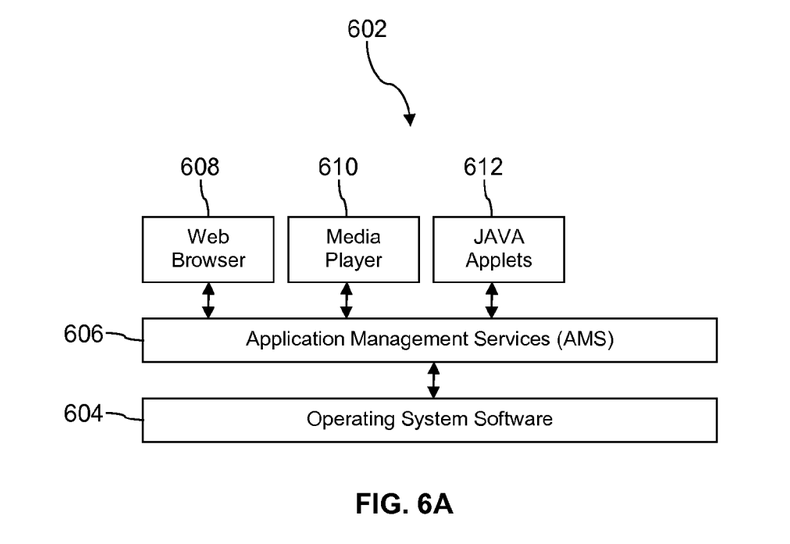
FIGS. 6A and 6B are block diagrams of software architecture for a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
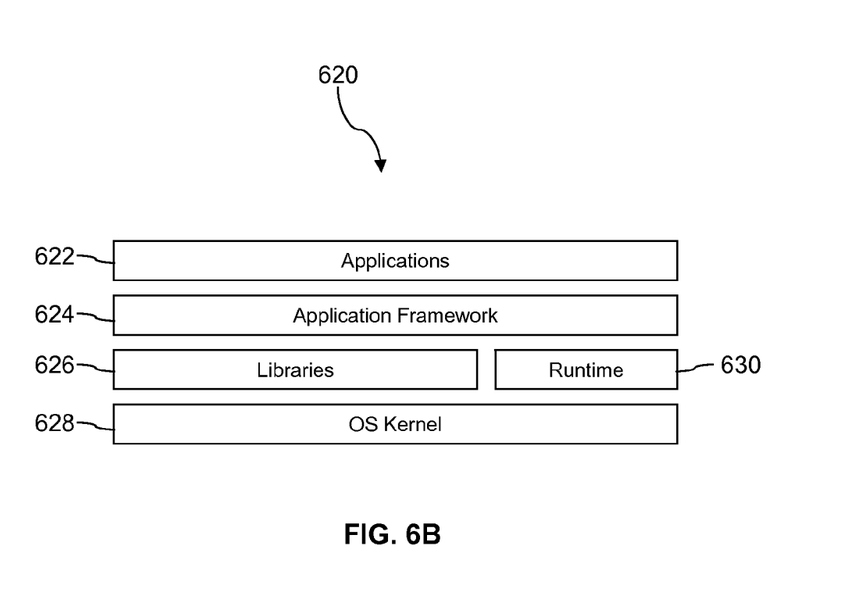

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
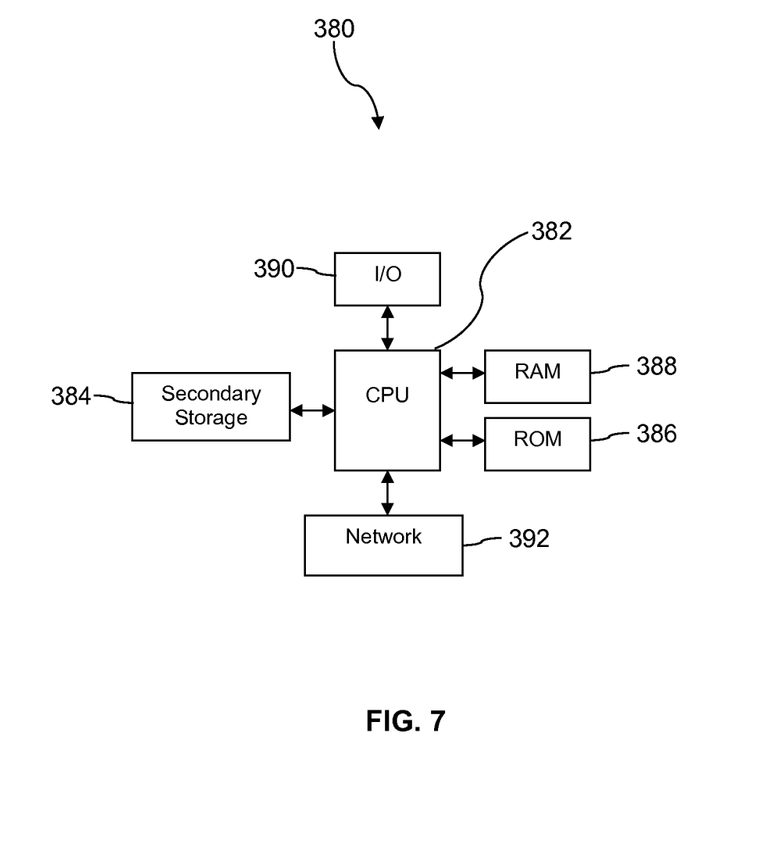
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A mobile communication device, comprising:
    a processor;
    a memory; and
    an application stored in the memory, that when executed by the processor,
        receives a key and a salt from a vehicle key server, wherein the key and the salt are numeric codes that are associated with the mobile communication device and a vehicle, and wherein the salt is random data that is used as an input to a one-way function that hashes a password or passphrase,
        generates a plurality of credentials based on the key and the salt using an algorithm, wherein the credentials are numeric codes that serve to unlock the vehicle,
        transmits a credential of the plurality of credentials to the vehicle, wherein the vehicle receives and compares the received credential with a plurality of credentials stored by the vehicle and the vehicle performs an unlock command and unlocks the vehicle when the received credential from the mobile communication device matches one of the plurality of credentials stored by the vehicle,
        generates a new salt, and
        transmits a sync command to the vehicle, wherein the sync command comprises the new salt, whereby the vehicle is commanded by the mobile communication device to generate a second plurality of credentials based on the key and the new salt using the algorithm.

2. The device of claim 1, wherein the key, the salt, and credentials are binary numbers, each number comprising at least 16 bits.

3. The device of claim 1, wherein the key, the salt, and credentials are binary numbers, each number comprising at least 32 bits, 64 bits, and 128 bits.

4. The device of claim 1, wherein the within the communicative relationship of the mobile communication device and the vehicle, the mobile communication device has dominance in ordering sync commands.

5. The device of claim 1, wherein the mobile communication device communicates with the motor vehicle and sends the sync command over a code division multiple access (CDMA) wireless protocol.

6. The device of claim 1, wherein the mobile communication device is configured to communicate using a radio transceiver according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another well-known wireless protocol.

7. A method of unlocking a motor vehicle using a mobile communication device with key functionality, comprising:
    receiving by a mobile communication device a key and a salt from a vehicle key server, wherein the key and the salt are numeric code values that are associated with the mobile communication device and a vehicle, and wherein the salt is random data that is used as an input to a one-way function that hashes a password or passphrase;
    generating by the mobile communication device a plurality of credentials based on the key and the salt using an algorithm, wherein the credentials are numeric codes that unlock the vehicle associated with the key;

transmitting by the mobile communication device a credential of the plurality of credentials to the vehicle, wherein the vehicle receives and compares the received credential with a plurality of credentials stored by the vehicle;

performing, by the vehicle, an unlock command and unlocking the vehicle when the received credential from the mobile communication device matches one of the plurality of credentials stored by the vehicle;

deleting by the mobile communication device used credentials that are no longer available for unlocking the vehicle;

sending a sync command by the mobile communication device to the vehicle, wherein the command comprises a new salt generated by the mobile communication device; whereby the vehicle is commanded by the mobile communication device to generate a second plurality of credentials based on the key and the new salt using the algorithm; and generating by the mobile communication device new credentials that are available for use to unlock the vehicle.

8. The method of claim 7, wherein the mobile communication device has a dominant role in the communication relationship between the mobile communication device and the vehicle.

9. The method of claim 7, wherein the number of credentials that the mobile communication device generates using the algorithm is 256.

10. The method of claim 7, wherein the mobile communication device communicates with the vehicle using a code division multiple access (CDMA) wireless protocol with a frequency of 300 to 400 megahertz.

11. The method of claim 7, wherein the vehicle uses a radio transceiver to communicate with the mobile communication device.

12. The method of claim 7, wherein the mechanism that the mobile communication device uses to communicate with the vehicle is an application.

13. The method of claim 12, wherein the application is either pre-loaded before the mobile communication device is used or post-loaded after the mobile communication device is used.

* * * * *